United States Patent
Subramanian

(10) Patent No.: US 11,159,402 B1
(45) Date of Patent: Oct. 26, 2021

(54) VIRTUAL MACHINE IMPORT/EXPORT RISK ASSESSMENT

(71) Applicant: Amazon Technologies, Inc., Reno, NV (US)

(72) Inventor: Hariharan Subramanian, Santa Clara, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/315,927

(22) Filed: Jun. 26, 2014

(51) Int. Cl.
*G06F 11/30* (2006.01)
*G06F 9/48* (2006.01)
*H04L 12/26* (2006.01)

(52) U.S. Cl.
CPC .................................. *H04L 43/045* (2013.01)

(58) Field of Classification Search
CPC ................................ G06F 8/71; G06F 9/44536
See application file for complete search history.

(56) References Cited

U.S. PATENT DOCUMENTS

| | | | |
|---|---|---|---|
| 6,742,023 B1* | 5/2004 | Fanning | G06F 17/30194 707/E17.032 |
| 2005/0256926 A1* | 11/2005 | Muhonen | H04L 67/303 709/235 |
| 2006/0153099 A1* | 7/2006 | Feldman | H04L 45/00 370/254 |
| 2009/0004974 A1* | 1/2009 | Pyhalammi | G06F 9/44536 455/67.11 |
| 2010/0100877 A1* | 4/2010 | Greene | G06F 9/5011 718/1 |
| 2011/0239214 A1* | 9/2011 | Frields | G06F 9/45533 718/1 |
| 2012/0008509 A1* | 1/2012 | Myers | H04W 24/06 370/252 |
| 2013/0132275 A1* | 5/2013 | Enzaldo | G06Q 40/02 705/44 |
| 2013/0312006 A1* | 11/2013 | Hardman | G06F 9/5027 718/105 |
| 2014/0313903 A1* | 10/2014 | Kikuzuki | H04L 47/122 370/238 |
| 2015/0067143 A1* | 3/2015 | Babakhan | G06F 11/301 709/224 |
| 2016/0078900 A1* | 3/2016 | Baron | H04N 21/21805 386/282 |

* cited by examiner

*Primary Examiner* — Nicholas R Taylor
*Assistant Examiner* — Ho T Shiu
(74) *Attorney, Agent, or Firm* — BakerHostetler

(57) ABSTRACT

In a provider network, a risk score for transferring computing resources between a source computing network and a provider network is determined based on an analysis of the computing resources. The analysis includes identifying configuration data associated with the computing resources and mapping the configuration data to scoring criteria to determine the risk score. A user interface is provided that is indicative of the risk score. The risk score is indicative of a predicted likelihood of success of the transfer.

18 Claims, 10 Drawing Sheets

VIRTUAL MACHINE IMPORT/EXPORT RISK ASSESSMENT

BACKGROUND

A data center is a facility that houses computer systems and various networking, storage, and other related components. Data centers may, for example, provide computing services to businesses and individuals as a remote computing service or to provide "software as a service" (e.g., cloud computing). To facilitate the utilization of data center resources, virtualization technologies may allow a single physical computing machine to host one or more instances of virtual machines that appear and operate as independent computer machines to a connected computer user. With virtualization, the single physical computing device can create, maintain, or delete virtual machines in a dynamic manner.

Customers of data centers may be provided a wide range of choices with regard to the resources that are selected and how the resources are set up and utilized. Depending on how the resources are set up and utilized, customers may experience different levels of performance for their resources.

BRIEF DESCRIPTION OF DRAWINGS

Throughout the drawings, reference numbers may be reused to indicate correspondence between referenced elements. The drawings are provided to illustrate example embodiments described herein and are not intended to limit the scope of the disclosure.

DETAILED DESCRIPTION

A service provider, such as an entity that operates a provider network, may offer computing resources, such as computing instances and storage resources to customers (who may also be referred to as entities or users). A customer may be any person or entity who accesses computing resources of a service provider. The service provider may, for example, provide a web services platform. Multiple customers may access the web services platform via a computing node and issue instructions to the web services platform. The web services platform may be also be referred to as a multi-tenant web services platform to denote that multiple customers may access the platform. The web services platform may respond to instructions by performing computing operations on one or more of a plurality of computing nodes that make up the web services platform.

Other types of resources may be offered by the provider network. For example, the provider network may provide an import/export service that enables the customer to import virtual machine images from the customer's existing environment to instances running on the provider network, or export the virtual machine images back to the customer's on-premises environment. By importing an existing virtual machine image, a customer can preserve the software and settings that have been configured in the customer's existing virtual machine, and after importation the customer may create multiple instances of the image, snapshot the image to back up the data, and take advantage of other services provided by the provider network. Importation of a virtual machine image can be an expensive operation in terms of cost and time. However, an attempted import of a virtual machine image may fail for various reasons. The present disclosure describes systems and methods for predicting the potential success of a virtual machine image import.

In some embodiments, the potential success of a virtual machine image import may be expressed as a risk/success score that may be calculated to indicate a success rate (migratability) of a customer's workload. The risk score may be based on factors such as workload utilization, service health, success rate of similar workloads that have been migrated, known unsupported configurations/data formats, and known bugs that may temporarily prevent successful migration of the customer's workload. By providing the customer with the risk/success score, the customer may assess the risks associated with migrating specific workloads and prioritize workloads for migration. Further details will now be described.

Figure 1:
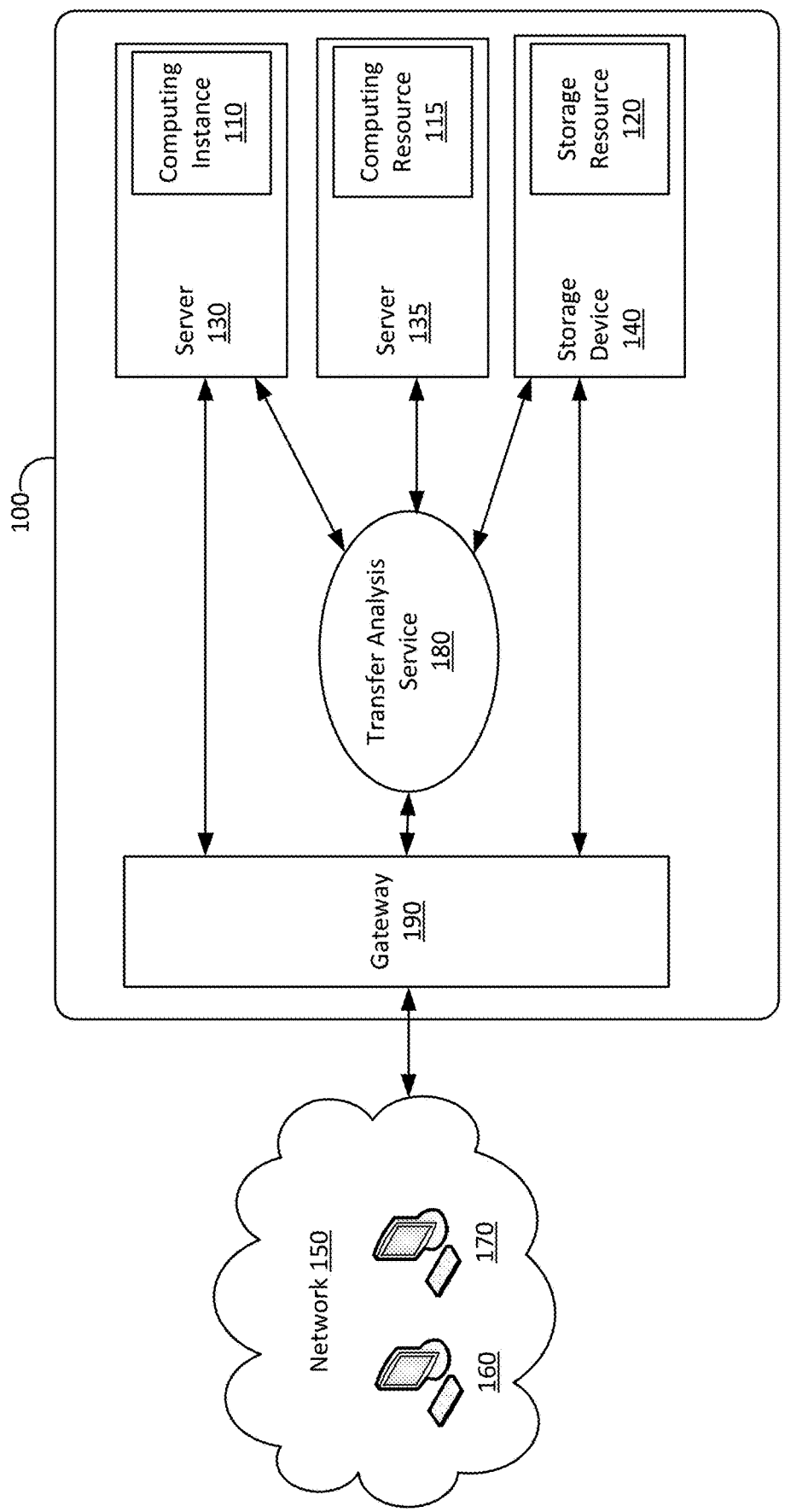
FIG. 1 is a diagram illustrating a mechanism for providing computing resources in accordance with the present disclosure.

Operators of provider networks, such as those described above, may, in some embodiments provide an infrastructure, such as transfer analysis service 180 depicted in FIG. 1 configured to provide customers with information such as a risk/success score of a proposed import or export of a virtual machine image.

A web services platform can be large and complex and can include a vast number of interconnected devices with a mix of various types of data flowing through both virtual and physical components. Computing devices, such as servers and routers, may have complex interactions, and behaviors in one area can affect the performance of the entire computing environment. In many cases, it may be difficult for a customer to ascertain how a particular virtual machine running on an off-premises environment will import to the provider network's on-premises environment and how the import process may be impacted by configuration decisions.

Various embodiments are disclosed for assessing and rating the likelihood of the risk/success of a proposed import or export of a virtual machine image. By being provided such an assessment and rating, customers may have an increased awareness of the risks associated with moving or migrating a virtual machine image to a new platform. Furthermore, the provider network may offer a level of service for the import/export based on the assessment and rating. The provider network may also advise customers how to modify their current configuration for improving the chances for a successful import/export.

In one embodiment, the provider network may implement an analysis service such as transfer analysis service 180 shown in FIG. 1. The transfer analysis service 180 may be configured to monitor utilization of various workloads and track how the workloads change over time. The migration of a workload to the provider network typically involves an expensive operation where data is copied over potentially slow network connections. It would be useful to identify which workloads may have the best transfer success rate so that customers can factor the success rate into decisions regarding which workloads to transfer or to prioritize.

In an embodiment, the transfer analysis service 180 may be configured to monitor and track data for the results of workload migrations in the provider network's environment and use the tracked data to calculate risk/success scores. The tracked data and risk scores can be accessed by the transfer analysis service 180 when a customer requests an import/export. The transfer analysis service 180 may determine a risk/success score for each of the workloads running on a customer's environment. The risk/success scores can be updated as additional tracked data becomes available.

In some embodiments, the transfer analysis service 180 may access health data for other provider network services (e.g., storage and database services). If a potential health issue associated with one or a combination of the provider network's services may potentially cause the customer's import to fail, then the risk/success score of the customer's workload may be adjusted until the health issue is resolved.

The risk/success score may also be based on known bugs (e.g., temporary errors or faults) that may affect the success rate of a migration. Once information regarding the known bugs is made available to the transfer analysis service 180, the risk/success score may be updated to adjust the indicated risk. The known bugs may have a greater impact on the migratability of specific customer workloads, and the provider network may inform the customer not to import specific workloads that may be affected by the bugs until the issue can be resolved.

In some embodiments, information regarding the amount of manual work involved in the migration of a specific workload may also be used to calculate the risk/success score. Additionally, customers who complete a migration may be provided the ability to return feedback to the transfer analysis service 180 on various aspects of the importation process. Such user feedback may be used to further refine future risk/success scores.

The transfer analysis service 180 may also access utilization data gathered over various periods of time to predict which time periods may be best suited for migrating the workload to the provider network environment given observed usage patterns. By using such data to identify time periods with the greatest chances of success, customers may be able to minimize service disruptions by selecting migrations during the time periods with the greatest chances of success. For example, for customers who are importing their workloads to the provider network for disaster recovery, the transfer analysis service 180 may predict the best time periods for the customer to migrate the latest snapshot of the virtual machine image to the provider network while maximizing efficiency and minimizing staleness of the snapshotted data.

In some embodiments, the transfer analysis service 180 may identify which configurations (e.g., OS version in a specific environment) has the highest chance of import success, and associate the configurations with various levels of service. In this way, configurations with known levels of success can be identified and tiered importation services can be provided that provide guaranteed or targeted rates of success based on the known levels.

The risk/success score may be expressed in a number of ways. For example, the risk/success score may be expressed as percentage probability over a sliding period of time. Different risk/success scores may be associated with different periods of time based on known information. The risk/success score may also be expressed as a real number between 0 and 1, as a ratio, or as one of a set of discrete indicators (e.g., high, medium, low). Other types of scoring methods may be incorporated.

The risk/success score may be presented to the customer dynamically when the customer signs up for the import service. The risk/success score may also be in a static manner such as a listing of import service tiers and associated risk scores.

In some embodiments, the risk/success score may be further determined based on checklists applicable to systems running at the service provider, best practices of the service provider, and from external sources. A risk/success score based on items covered by a customer's configuration at a specific point in time can be used to assess a virtual machine's state and thus a measurable basis for evaluation. In one embodiment, a risk/success rating model may be implemented as including a set of checklists organized in progressive levels covering factors such as system health, known bugs, operating system, and applications. The checklists can be assessed manually or programmatically.

FIG. 1 is a diagram illustrating a system 100 including a framework for providing transfer analysis in accordance with the present disclosure. In FIG. 1, system 100 may include a computing instance 110, a computing resource 115, and a storage resource 120 that may be implemented, for example, on server computers 130 and 135 and storage device 140, respectively. It will be appreciated that some embodiments may involve additional resources of various types that may be instantiated on additional server computers or storage devices.

FIG. 1 also illustrates a public network 150 that may include one or more computers, such as computers 160 and 170. According to one embodiment, computing instance 110, computing resource 115, and storage resource 120 may be configured to provide computing services to a computer user (not shown) of public network 150 via gateway 190 and computers 160 and 170. For example, a customer may import one or more virtual instance images to computing instance 110, computing resource 115, and storage resource 120.

A user at computer 160 or 170 may send a request to a transfer analysis service 180 for risk assessments pertaining to the customer's resources and to import one or more resources. In some embodiments, a request may be received directly from the user at computer 160 or 170. The request may be also received by other services running on system 100. In response to the receipt of the request, transfer analysis service 180 may log the request and provide a response to the request. The transfer analysis service 180 may communicate with other services to facilitate: (1) processing of the request, (2) accessing data pertaining to request, and (3) generating interfaces to provide results for the request. The transfer analysis service 180 may provide an interface for facilitating submission of the request. The transfer analysis service 180 may further provide an interface for viewing the results of the request and taking further actions in response to the request.

A service, such as transfer analysis service 180, may be configured to provide real-time or accumulated and/or archived monitoring of import/export activities that may be used for assessing specific import/export requests. The monitored activities may include transfers of virtual machine images of various types. The monitored resources may also include other computing resources provided by the service provider, such as storage services and database services. As used herein, computing resources can include any computing and networking resource made available by the provider network for use by customers of the provider network, including virtual computing instances, storage capacity, virtual network topologies (e.g., IP address ranges, firewall configurations, etc.), and so on. The transfer analysis service 180 may also access metrics, such as health status, data transfers, and disk usage activity. The transfer analysis service 180 may be made accessible via an API or a user interface that may be accessed via a web browser or other input mechanisms.

In some embodiments, transfer analysis service 180 may include a risk/success scoring component to provide risk/success ratings or scores. The risk/success ratings or scores may be based, for example, on a risk/success scoring model and one or more best practices of the provider network and/or external sources. The risk/success scoring component may analyze a customer's computing resources and generate risk/success assessments that may be useful to indicate risk/success predictions according to one or more categories.

Transfer analysis service 180 may also include a risk/success advisor component to provide recommendations that may improve the risk/success ratings or scores provided by the risk/success scoring component. The recommendations may be based on an analysis of metrics associated with a customer as well as the service provider's aggregated operational history. The risk/success advisor component may inspect a customer's allocated computing resources and generate recommendations that may, if implemented, provide improvements to import/export performance.

In some embodiments, the risk/success advisor component of transfer analysis service 180 may provide recommended configurations based on priorities and requirements provided by the customer. The recommendations may be based on an analysis of the customer's priorities and requirements as well as best practices and other information accessible by the service provider.

In some embodiments, an API may facilitate requests for generating risk/success scores or ratings and recommendations. For example, the API can be called with information, such as a resource identifier, resource configuration, and applications. After the API is called, in one embodiment the transfer analysis service 180 may take actions such as:

Invoke a function to generate a baseline of available metrics pertaining to the risk/success analysis and customer resources.

Retrieve configurations of the customer's resources.

Call available APIs that can provide metrics for the customer's resources.

Access applicable data, such as checklists, pertaining to relevant best practices.

Using the gathered information, the transfer analysis service 180 may analyze the data, combine or aggregate the data, or extract portions of the data as appropriate to determine risks and a risk/success score. The risk/success may be reported through the API along with details about any recommendations.

Figure 2:
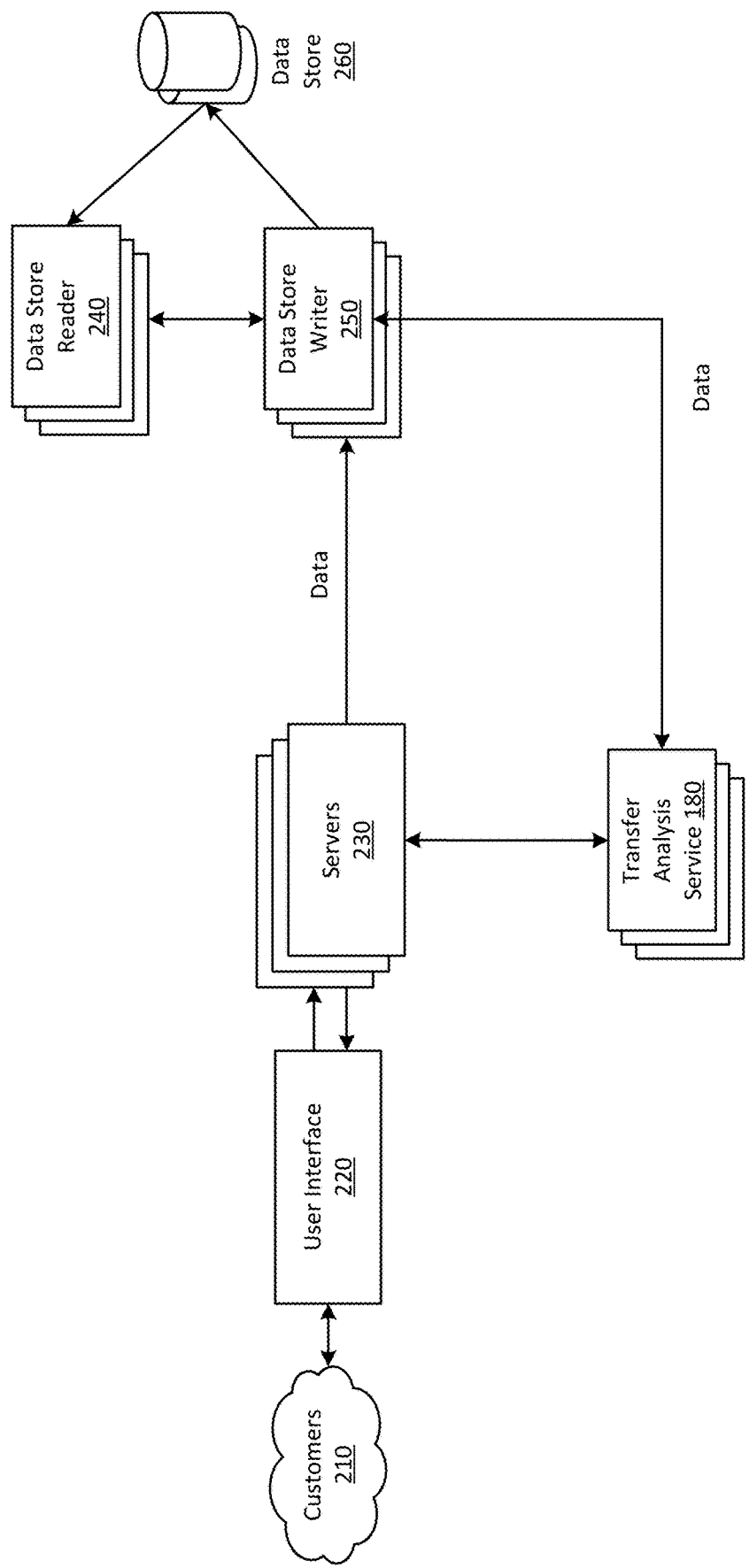
FIG. 2 is a diagram illustrating a system for providing resource transfer analysis in accordance with the present disclosure.

Referring to FIG. 2, illustrated is one example implementation of functionality associated with the transfer analysis service 180. The transfer analysis service 180 may access or cause access to various data. Customers 210 of the service provider may access a user interface 220 for viewing status and requesting import or export of a resource. In some embodiments, the user interface 220 can be generated by functions implemented in software executing on one or more of the service provider's servers 230. Data pertaining to import/export activity at the provider network may be provided to a data store writer 250 that may store the data. A data store reader 240 may be configured to access the data store 260 and retrieve data based on requests from transfer analysis service 180 or for other purposes.

Figure 3:
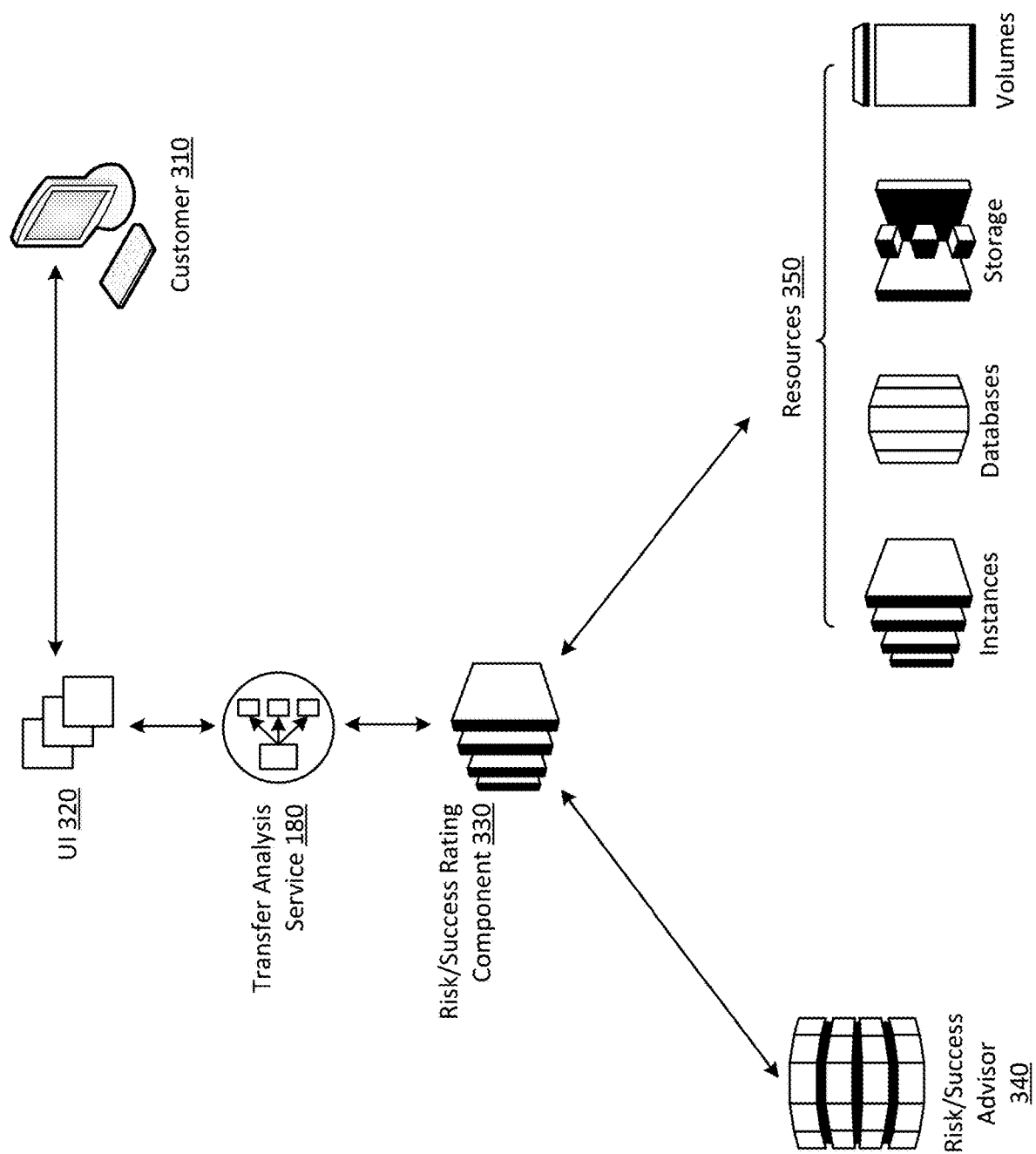
FIG. 3 is a diagram illustrating a system for providing resource transfer analysis in accordance with the present disclosure.

Referring to FIG. 3, illustrated is another example of risk/success scoring in accordance with this disclosure. Referring to FIG. 3, a customer 310 may access a user interface 320 depicting services related to a selected item of interest related to resource transfer analysis. A user interface may be generated that depicts a representation of a risk/success score for the customer 310. Additional user interfaces may be provided based on requests from the customer for additional data. The user interface 320, as well as other user interfaces that may be used to present resource transfer analysis information to a user, may in some embodiments be generated by the service provider and sent to the user's display for rendering. In other embodiments, the user's computing device may include functionality to generate some or all portions of the user interface. For example, the user's web browser may include code for generating some of the graphics for rendering data received from the service provider. The service provider may receive the selection information from the user's computing device and provide the requested information. The user interface 320 may be generated or caused to be generated by transfer analysis service 180.

Transfer analysis service 180 may interact with a risk/success rating component 330. The risk/success rating component 330 may access a risk/success recommendations generated by a risk/success advisor component to generate one or more scores or ratings. The scores or ratings may be used to determine potential changes to resources 350.

Figure 4:
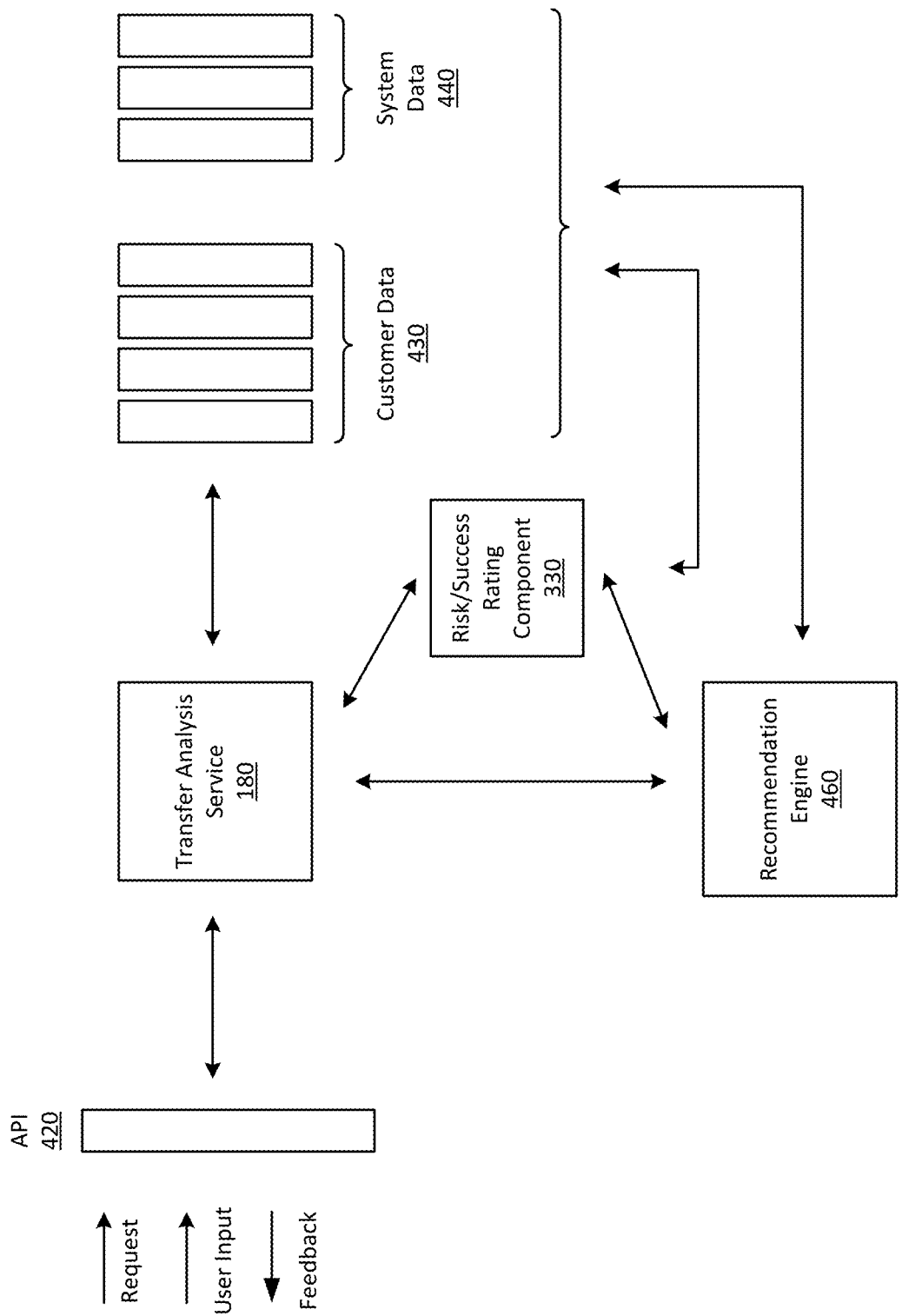
FIG. 4 is a diagram illustrating a system for providing resource transfer analysis in accordance with the present disclosure.

Referring to FIG. 4, illustrated is an example of analyzing resources in accordance with this disclosure. Referring to FIG. 4, a provider network may implement an API 420 that is configured to receive requests for resource transfers. Requests may be managed by transfer analysis service 180 that may communicate with one or more systems in the provider network to access customer data 430 and system and system data 440. API 420 may also be configured to receive inputs from users pertaining to transfer requests. User inputs may be managed by transfer analysis service 180 in additional to customer data 430 and system data 440. User feedback may be received by API 420 regarding the transfer. In some embodiments, a client agent may be installed on the user-side computing environment to facilitate analysis of the user-side computing environment and provide data based on the analysis to the API 420. For example, a plug-in may be installed on one or more computing devices on the user-side computing environment that executes within the paradigm of the user-side computing environment to provide a user interface, executable components that gather information pertaining to the user side computing environment, and so on.

Transfer analysis service 180 may also interact with risk/success rating component 330 and recommendation engine 460 to analyze the customer data 430 and system data 440 and determine potential improvements. Based on the analysis, transfer analysis service 180 may identify recommendations that can be provided to the customer.

The transfer analysis service 180 may be configured to determine which information is relevant for data collection or analysis. In some embodiments, the transfer analysis service 180 may implement a pattern classification system to identify relevant parameters. For example, the transfer analysis service 180 may include a learning system that may include a learning function to continuously learn which properties are relevant to a particular import/export issue.

The results of the analysis may take any number of forms. In one embodiment, the results may be presented as a list of potential changes that may be made to configurable parameters for a customer's resources. The list may be ordered in increasing or decreasing fashion based on potential relevance. The transfer analysis service 180 may provide a recommendation to the customer based on the analysis. For example, the recommendation may identify a potential change to the customer's configuration for selected instances that may result in an improved risk score. Alternatively, the list of potential changes may be provided, and the user may make a determination as to any configuration changes to be made. One advantage of providing such a list is that the customer is provided an ordered listing of relevant parameters that may help the customer make more intelligent choices, so that the customer can prioritize their transfers and ensure that the desired services continue to be provided at the desired performance level.

Figure 5:
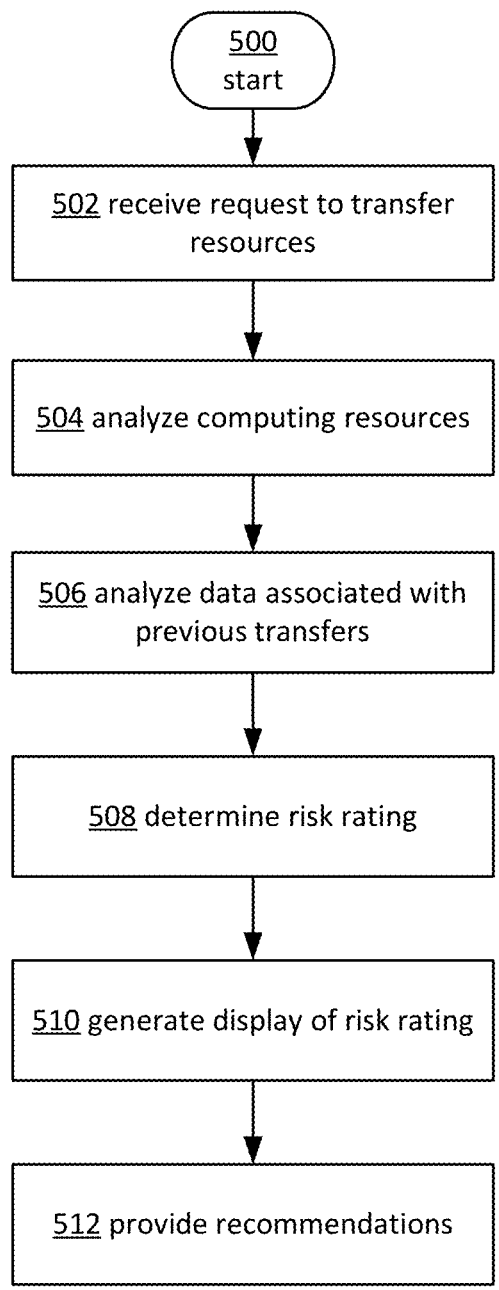
FIG. 5 is a flow diagram that illustrates an example of providing transfer resource analysis in accordance with the present disclosure.

FIG. 5 illustrates an example operational procedure for providing an assessment of a transfer of a computing resource. In an embodiment, a system for providing computing resources can be provided by services, such as transfer analysis service 180 in FIG. 1. The operational procedure may be implemented in a system comprising one or more computing devices. Referring to FIG. 5, operation 500 begins the operational procedure. Operation 500 may be followed by operation 502. Operation 502 illustrates receiving from a user of computing resources operated by a provider network operating compute capacity, a request to transfer one or more computing resources from a source computing network to the provider network. The computing resources may include any resources provided by the provider network including a virtual machine image, a storage resource, a network resource, an application, and so on.

Operation 502 may be followed by operation 504. Operation 504 illustrates analyzing the one or more computing resources. Operation 504 may be followed by operation 506. Operation 506 illustrates analyzing data associated with previous transfers by users of the provider network that pertain to the requested transfer. Operation 506 may be followed by operation 508. Operation 508 illustrates determining a risk rating for the requested transfer. In some embodiments, the risk rating may be based on scoring criteria associated with the requested transfer.

Operation 508 may be followed by operation 510. Operation 510 illustrates generating data usable to render a user interface indicative of the determined risk rating. In an embodiment, the determined risk rating may be indicative of a predicted likelihood of success of the requested transfer. Operation 510 may be followed by operation 512. Operation 512 illustrates providing one or more recommendations pertaining to improvements to the risk rating. In one embodiment, the recommendations may include time periods for transferring the computing resources.

In various embodiments, the scoring criteria may comprise one or more of workload utilization of the computing resources, a success rate of similar transfers at the provider network, known unsupported configurations and data formats of the computing resources, and/or a known error or fault (i.e., a bug) at the provider network.

It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

Networks established by or on behalf of an entity, such as a company or organization, to provide one or more services (such as various types of cloud-based computing or storage) accessible via the Internet and/or other networks to a distributed set of clients may be termed provider networks. Such a provider network may include one or more data centers hosting various resource pools, such as collections of physical and/or virtualized computer servers, storage devices, networking equipment, and the like, that may be used to implement and distribute the infrastructure and services offered by the provider network. The resources may in some embodiments be offered to clients in units called "instances," such as virtual or physical compute instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices, and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general purpose or special purpose operating systems, platforms that support various interpreted or compiled programming languages, such as Ruby, Perl, Python, C, C++, and the like, or high-performance computing platforms) suitable for the applications.

This may be done without, for example, requiring the client to access an instance or an execution platform directly. A given execution platform may utilize one or more resource instances in some implementations; in other implementations, multiple execution platforms may be mapped to a single resource instance.

Figure 6:
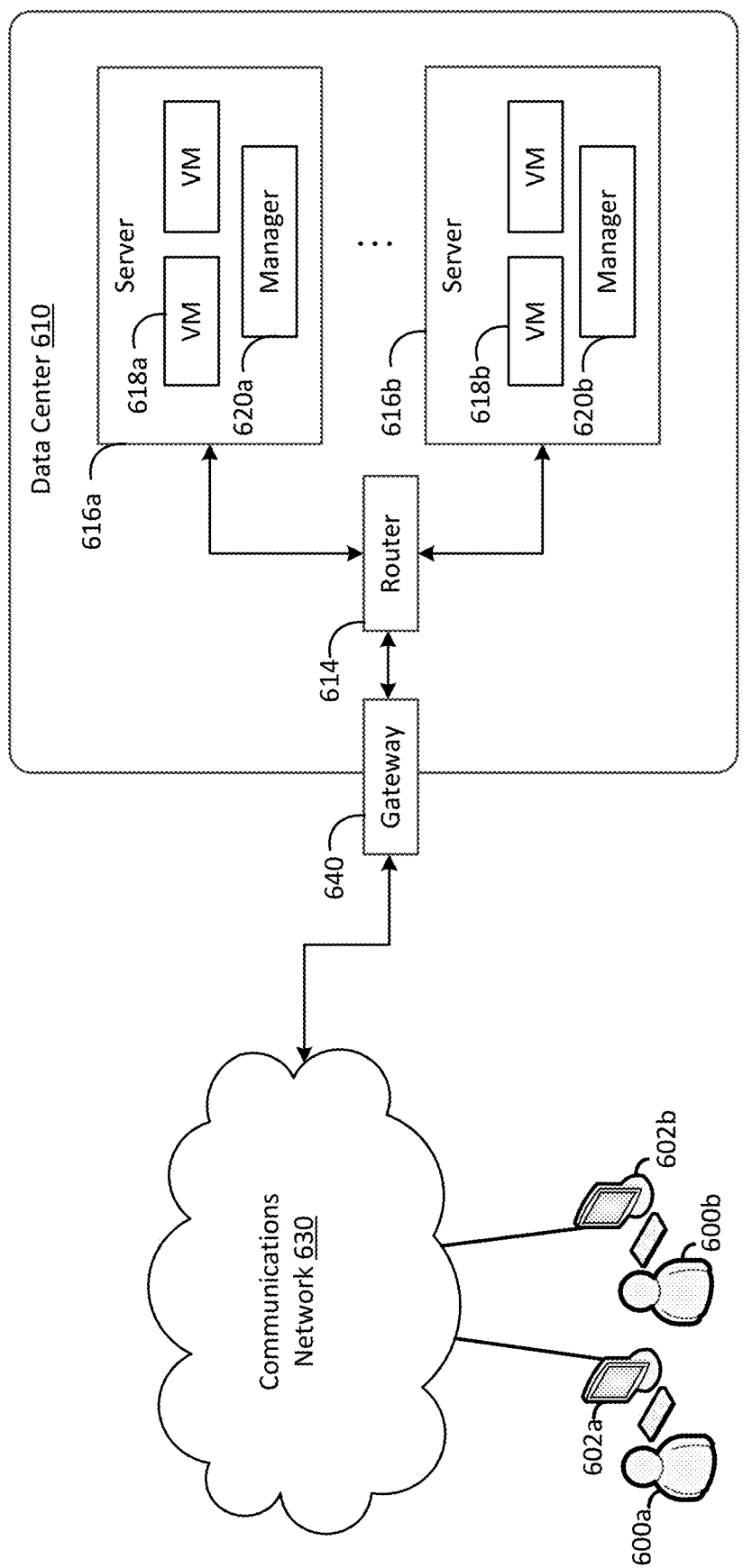
FIG. 6 is a diagram illustrating an example computing system that may be used in some embodiments.

FIG. 6 illustrates an example computing environment in which the embodiments described herein may be implemented. FIG. 6 is a diagram schematically illustrating an example of a data center 610 that can provide computing resources to users 600a and 600b (which may be referred herein singularly as "a user 600" or in the plural as "the users 600") via user computers 602a and 602b (which may be referred herein singularly as "a computer 602" or in the plural as "the computers 602") via a communications network 630. Data center 610 may be configured to provide computing resources for executing applications on a permanent or an as-needed basis. The computing resources provided by data center 610 may include various types of resources, such as data processing resources, data storage resources, data communication resources, and the like. Each type of computing resource may be general purpose or may be available in a number of specific configurations. For example, data processing resources may be available as virtual machine instances. The instances may be configured to execute applications, including web servers, application servers, media servers, database servers, and the like. Data storage resources may include file storage devices, block storage devices, and the like.

Each type or configuration of computing resource may be available in different sizes, such as large resources, consisting of many processors, large amounts of memory, and/or large storage capacity, and small resources consisting of fewer processors, smaller amounts of memory, and/or smaller storage capacity. Customers may choose to allocate a number of small processing resources as web servers and/or one large processing resource as a database server, for example.

Data center 610 may include servers 616a and 616b (which may be referred herein singularly as "a server 616" or in the plural as "the servers 616") that provide computing resources available as virtual machine instances 618a and 618b (which may be referred herein singularly as "a virtual machine instance 618" or in the plural as "the virtual machine instances 618"). The virtual machine instances 618 may be configured to execute applications, including Web servers, application servers, media servers, database servers, and the like. Other resources that may be provided include data storage resources (not shown) and may include file storage devices, block storage devices, and the like.

The availability of virtualization technologies for computing hardware has provided benefits for providing large scale computing resources for customers and allowing computing resources to be efficiently and securely shared between multiple customers. For example, virtualization technologies, such as those provided by VMware or other virtualization systems, may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 6, communications network 630 may, for example, be a publicly accessible network of linked networks and possibly operated by various distinct parties, such as the Internet. In other embodiments, communications network 630 may be a private network, such as, for example, a corporate or university network that is wholly or partially inaccessible to non-privileged users. In still other embodiments, communications network 630 may include one or more private networks with access to and/or from the Internet.

Communications network 630 may provide access to computers 602. Computers 602 may be computers utilized by customers 600 or other customers of data center 610. For instance, user computer 602a or 602b may be a server, a desktop or laptop personal computer, a tablet computer, a wireless telephone, a personal digital assistant (PDA), an e-book reader, a game console, a set-top box, or any other computing device capable of accessing data center 610. User computer 602a or 602b may connect directly to the Internet (e.g., via a cable modem or a Digital Subscriber Line (DSL)). Although only two user computers 602a and 602b are depicted, it should be appreciated that there may be multiple user computers.

Computers 602 may also be utilized to configure aspects of the computing resources provided by data center 610. In this regard, data center 610 might provide a Web interface through which aspects of its operation may be configured through the use of a Web browser application program executing on user computer 602. Alternatively, a stand-alone application program executing on user computer 602 might access an application programming interface (API) exposed by data center 610 for performing the configuration operations. Other mechanisms for configuring the operation of the data center 610, including deploying updates to an application, might also be utilized.

Servers 616a and 616b (which may be referred herein singularly as "a server 616" or in the plural as "the servers 616") shown in FIG. 6 may be standard servers configured appropriately for providing the computing resources described above and may provide computing resources for executing one or more applications. In one embodiment, the computing resources may be virtual machine instances 618. In the example of virtual machine instances, each of the servers 616 may be configured to execute an instance manager 620a or 620b (which may be referred herein singularly as "an instance manager 620" or in the plural as "the instance managers 620") capable of executing the virtual machine instances. The instance managers 620 may be a virtual machine monitor (VMM) or another type of program configured to enable the execution of virtual machine instances 618 on servers 616, for example. As discussed above, each of the virtual machine instances 618 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 610 shown in FIG. 6, a router 614 may be utilized to interconnect the servers 616a and 616b. Router 614 may also be connected to gateway 240, which is connected to communications network 630. Router 614 may manage communications within networks in data center 610, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 610 described in FIG. 6 is merely illustrative and that other implementations might be utilized. Additionally, it should be appreciated that the functionality disclosed herein might be implemented in software, hardware, or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

The capacity of purchased computing resources provided by data center 610 can be scaled in response to demand. In this regard, scaling refers to the process of instantiating (which may also be referred to herein as "launching" or "creating") or terminating (which may also be referred to herein as "de-scaling") instances of computing resources in response to demand. In this manner, the capacity of resources purchased by a customer of data center 610 can be scaled on-demand.

Auto scaling is one mechanism for scaling computing resources in response to increases or lulls in demand for the resources. Auto scaling allows customers of data center 610 to configure data center 610 to scale their purchased computing resources according to conditions defined by the customer. For instance, rules may be defined for scaling up capacity in a particular manner in response to the occurrence of specified conditions, such as a spike in demand. Similarly, rules might also be defined to scale down capacity in a particular manner in response to the occurrence of other conditions, such as a lull in demand. The mechanisms disclosed herein for launching virtual machine instances might be utilized when instances are manually launched by a customer or when instances are launched by an auto scaling component in data center 610.

Data center 610 may also be configured with a deployment component to assist customers in the deployment of new instances of computing resources. The deployment component may receive a configuration from a customer that includes data describing how new instances should be configured. For example, the configuration might specify one or more applications or software components that should be installed in new instances, provide scripts, and/or other types of code to be executed in new instances, provide cache warming logic specifying how an application cache should be prepared, and other types of information. The deployment component utilizes the customer-provided configuration and cache warming logic to launch, configure, and prime new instances of computing resources.

Figure 7:
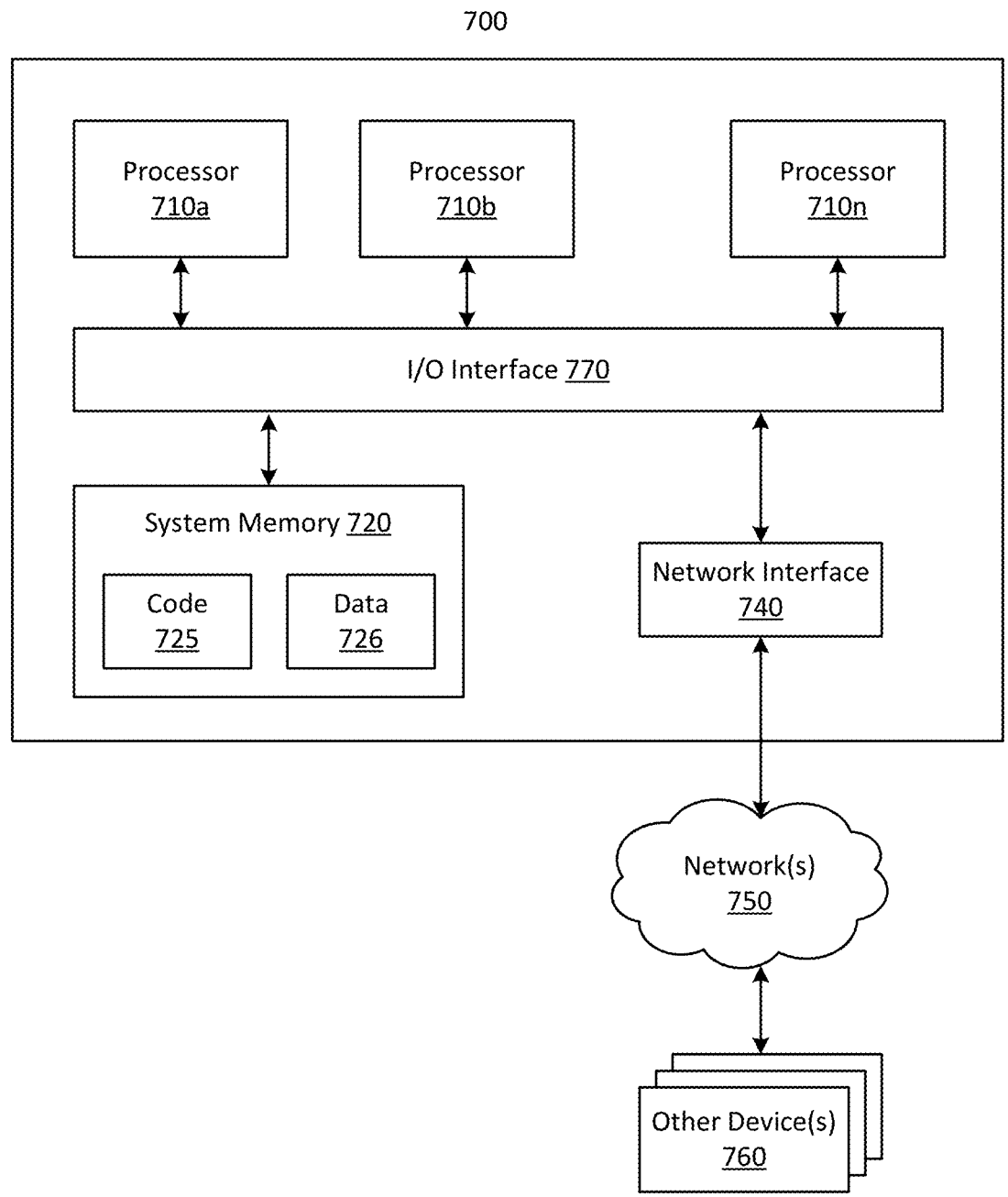
FIG. 7 is a diagram illustrating an example computing system that may be used in some embodiments.

In at least some embodiments, a server that implements a portion or all of one or more of the technologies described herein, including the techniques to implement the functionality of a transfer analysis service 180 may include a general purpose computer system that includes or is configured to access one or more computer-accessible media. FIG. 7 illustrates such a general purpose computing device 700. In the illustrated embodiment, computing device 700 includes one or more processors 710a, 710b, and/or 710n (which may be referred herein singularly as "a processor 710" or in the plural as "the processors 710") coupled to a system memory 720 via an input/output (I/O) interface 770. Computing device 700 further includes a network interface 740 coupled to I/O interface 770.

In various embodiments, computing device 700 may be a uniprocessor system including one processor 710 or a multiprocessor system including several processors 710 (e.g., two, four, eight, or another suitable number). Processors 710 may be any suitable processors capable of executing instructions. For example, in various embodiments, processors 710 may be general purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store instructions and data accessible by processor(s) 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 720 as code 725 and data 726.

In one embodiment, I/O interface 770 may be configured to coordinate I/O traffic between processor 710, system memory 720, and any peripheral devices in the device, including network interface 740 or other peripheral interfaces. In some embodiments, I/O interface 770 may perform any necessary protocol, timing, or other data transformations to convert data signals from one component (e.g., system memory 720) into a format suitable for use by another component (e.g., processor 710). In some embodiments, I/O interface 770 may include support for devices attached through various types of peripheral buses, such as a variant of the Peripheral Component Interconnect (PCI) bus standard or the Universal Serial Bus (USB) standard, for example. In some embodiments, the function of I/O interface 770 may be split into two or more separate components, such as a north bridge and a south bridge, for example. Also, in some embodiments some or all of the functionality of I/O interface 770, such as an interface to system memory 720, may be incorporated directly into processor 710.

Network interface 740 may be configured to allow data to be exchanged between computing device 700 and other device or devices 760 attached to a network or network(s) 750, such as other computer systems or devices as illustrated in FIGS. 1 through 7, for example. In various embodiments, network interface 740 may support communication via any suitable wired or wireless general data networks, such as types of Ethernet networks, for example. Additionally, network interface 740 may support communication via telecommunications/telephony networks, such as analog voice networks or digital fiber communications networks, via storage area networks, such as Fibre Channel SANs, or via any other suitable type of network and/or protocol.

In some embodiments, system memory 720 may be one embodiment of a computer-accessible medium configured to store program instructions and data as described above for implementing embodiments of the corresponding methods and systems. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 700 via I/O interface 770. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 700 as system memory 720 or another type of memory. Further, a computer-accessible medium may include transmission media or signals such as electrical, electromagnetic or digital signals, conveyed via a communication medium such as a network and/or a wireless link, such as may be implemented via network interface 740. Portions or all of multiple computing devices, such as those illustrated in FIG. 7, may be used to implement the described functionality in various embodiments; for example, software components running on a variety of different devices and servers may collaborate to provide the functionality. In some embodiments, portions of the described functionality may be implemented using storage devices, network devices, or special purpose computer systems, in addition to or instead of being implemented using general purpose computer systems. The term "computing device," as used herein, refers to at least all these types of devices and is not limited to these types of devices.

A network set up by an entity, such as a company or a public sector organization, to provide one or more services (such as various types of cloud-based computing or storage) accessible via the Internet and/or other networks to a distributed set of clients, may be termed a provider network. Such a provider network may include numerous data centers hosting various resource pools, such as collections of physical and/or virtualized computer servers, storage devices, networking equipment, and the like, needed to implement and distribute the infrastructure and services offered by the provider network. The resources may in some embodiments be offered to clients in units called instances, such as virtual or physical computing instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices, and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general purpose or special purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems (OS) and/or hypervisors and with various installed software applications, runtimes, and the like. Instances may further be available in specific availability zones, representing a data center, or other geographic location of the underlying computing hardware, for example.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster).

The provider network may make instances available "on-demand," allowing a customer to select a number of instances of a specific type and configuration (e.g. size, platform, tenancy, availability zone, and the like) and quickly launch the instances for deployment. On-demand instances may further be added or removed as needed, either manually or automatically through auto scaling, as demand for or capacity requirements changes over time. The customer may incur ongoing usage costs related to their on-demand instances, based on the number of hours of operation and/or the actual resources utilized, for example.

The computing resource provider may also make reserved instances available to the customer. Reserved instances may provide the customer with the ability to reserve a number of a specific type and configuration of instances for a fixed term, such as one year or three years, for a low, upfront cost in exchange for reduced hourly or other usage costs, for example, if and when the instances are launched. This may allow the customer to defer costs related to scaling up the deployed application in response to increase in demand, while ensuring that the right resources will be available when needed. While reserved instances provide customers with reliable, stand-by capacity for scaling of their application, purchasing reserved instances may also lock the customer into a specific number, type, and/or configuration of computing resource in a specific availability zone for a longer period than desired. If the technical architecture or needs of the application change, the customer may not be able to realize a return on the customer's investment in the reserved instances.

Operators of such provider networks may in some instances implement a flexible set of resource reservation, control, and access interfaces for their clients. For example, a resource manager of the provider network may implement a programmatic resource reservation interface (e.g., via a web site or a set of web pages) that allows clients to learn about, select, purchase access to, and/or reserve resource instances. In some embodiments discussed below where an entity, such as a resource manager or a pricing optimizer, is described as implementing one or more programmatic interfaces, such as a web page or an API, an interface manager subcomponent of that entity may be responsible for the interface-related functionality. In many embodiments equivalent interface-related functionality may be implemented by a separate or standalone interface manager, external to the resource manager and the pricing optimizer. Such an interface may include capabilities to allow browsing of a resource catalog and details and specifications of the different types or sizes of resources supported and the different reservation types or modes supported, pricing models, and so on.

The provider network may support several different purchasing modes (which may also be referred to herein as reservation modes) corresponding to some of the instance types described above. For example, the provider network may support long-term reservations, on-demand resource allocations, or spot-price-based resource allocations. Using the long-term reservation mode, a client may make a low, one-time, upfront payment for a resource instance, reserve it for a specified duration, such as a one- or three-year term, and pay a low hourly rate for the instance; the client would be assured of having the reserved instance available for the term of the reservation. Using the on-demand mode, a client could pay for capacity by the hour (or some appropriate time unit), without any long-term commitments or upfront payments. In the spot-price mode, a client could specify the maximum price per unit of time that it is willing to pay for a particular type of resource, and if the client's maximum price exceeded a dynamic spot price determined at least in part by supply and demand, then that type of resource would be provided to the client. In some embodiments, dynamically resizable pools of resource instances may be set aside for the different reservation types or modes—e.g., long-term reserved instances may be allocated from one pool, on-demand instances from another, and so on. During periods when the supply of the requested resource type exceeded the demand, the spot price may become significantly lower than the price for the on-demand mode. In some implementations, if the spot price increases beyond the maximum bid specified by a client, a resource allocation may be interrupted—i.e., a resource instance that was previously allocated to the client may be reclaimed by the resource manager and may be allocated to some other client that is willing to pay a higher price. Other purchasing modes or combinations of modes may be implemented by the resource manager in some embodiments.

Figure 8:
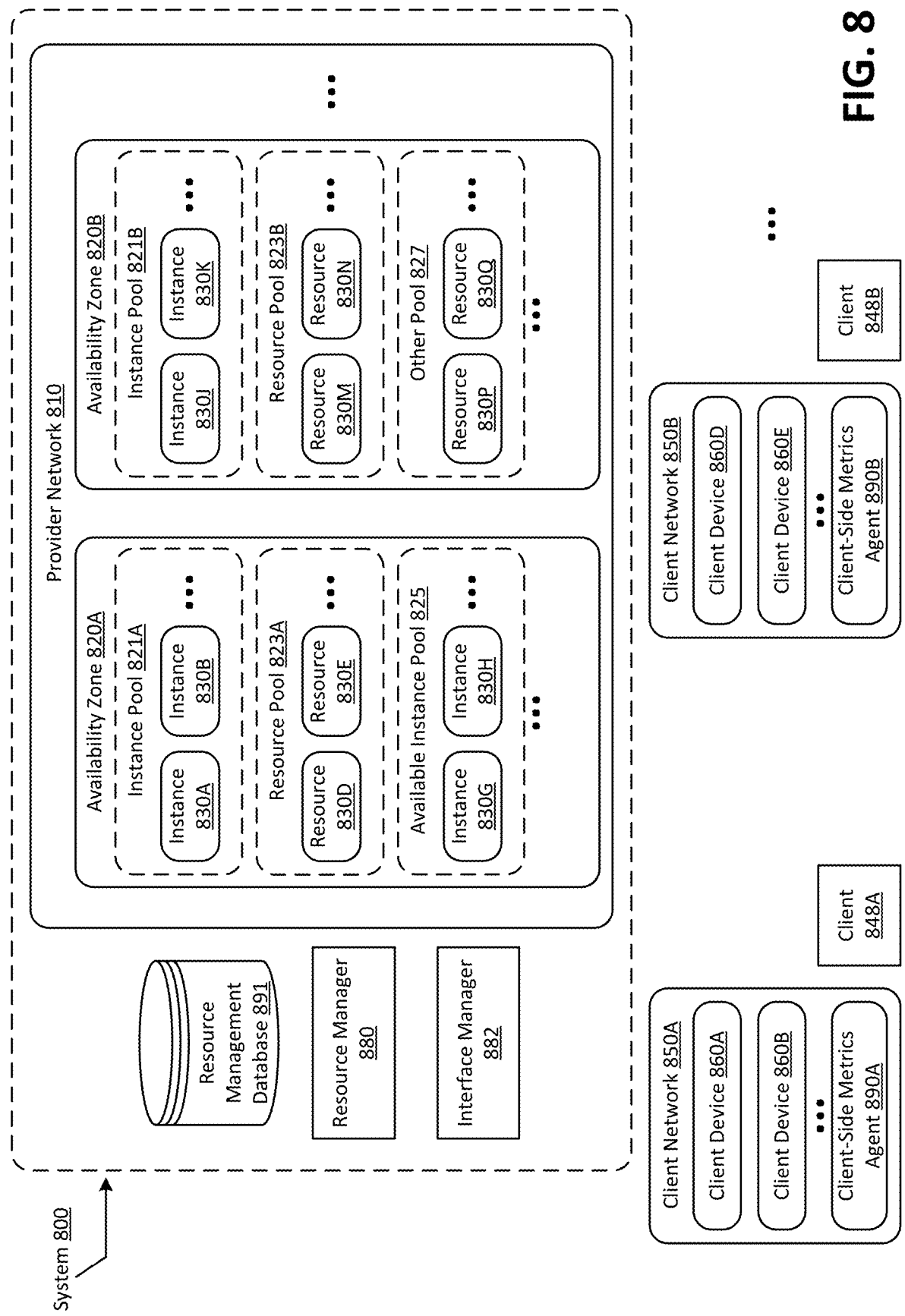
FIG. 8 is a diagram illustrating an example computing system that may be used in some embodiments.

FIG. 8 illustrates an example system environment for providing instances, according to at least some embodiments. The system 800 may include a provider network 810 comprising a plurality of resource instances 830 (which may be referred herein singularly as "a resource instance 830" or in the plural as "the resource instances 830"), such as instances 830A, 830B, 830D, 830E, 830G, and 830H in one availability zone 820A and instances 830J, 830K, 830M, 830N, 830P, and 830Q in a different availability zone 820B. The various resource instances 830 in the availability zones 820A and 820B (which may be referred herein singularly as "an availability zone 820" or in the plural as "the availability zones 820") may be reserved and/or allocated for use by clients (or potential clients), such as client 848A and 848B (which may be referred herein singularly as "a client 848" or in the plural as "the clients 848"). In the illustrated embodiment, system 800 includes a resource manager 880 and an interface manager 882. As noted earlier, in some embodiments the functionality of the interface manager 880 may be implemented by a subcomponent of the resource manager 882.

The interface manager 882 may in some embodiments implement one or more programmatic interfaces allowing clients 848 to search for, browse, reserve, and acquire instances 830 to obtain various types of services, e.g., to run and/or access various applications. In the illustrated embodiment, at a given point in time, some or all of the instances 830 may be assigned to instance pools, such as instance pools 821A or 821B, resource pools 823A or 823B, available instance pool 825, or other pools, such as other pool 827.

In some embodiments a given pool, such as available instance pool 825, may itself contain its own sub-pools, e.g., based on the modes of instance reservation and allocation supported. Each pool (or sub-pool) may have an associated pricing policy for its instances, as well as other properties, such as interruptibility settings, for the instances that happen to be assigned to the pool or sub-pool. The pools may represent logical collections or aggregations, so that, for example, the presence of two instances in the same pool or sub-pool may not necessarily imply anything about the physical location of the hardware used for the two instances. Although the instances 830 illustrated in FIG. 8 are shown as belonging to availability zones 820, in other embodiments the provider network 810 may be organized differently, e.g., in some embodiments, availability zones 820 may not be implemented. Availability zones 820 may be grouped into geographic regions (not shown in FIG. 8) in some embodiments. Instance pools may be implemented within availability zones in some implementations (e.g., each availability zone may have its own reserved instance pool); while in other implementations an instance pool or sub-pool may span multiple availability zones.

Figure 9:
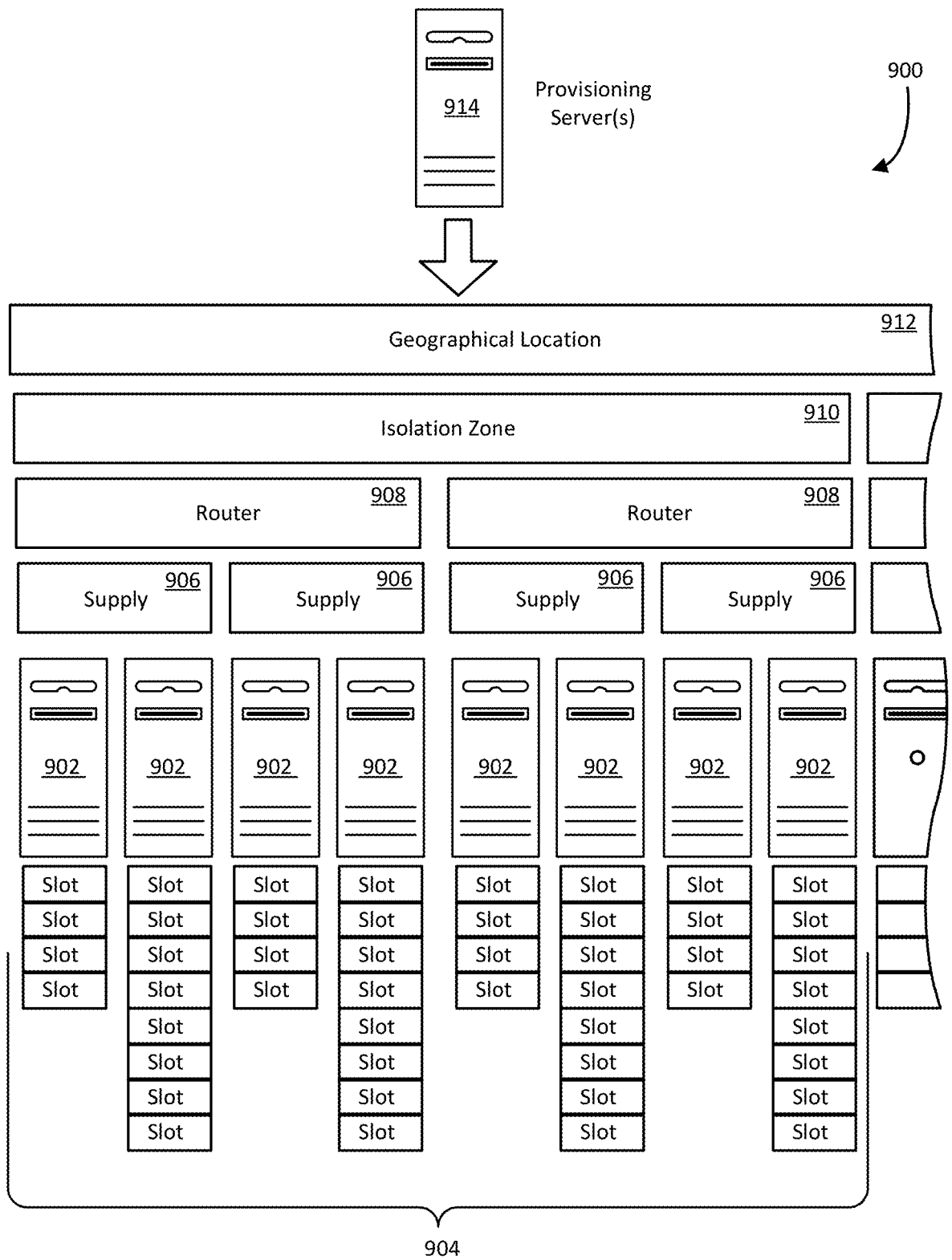
FIG. 9 is a diagram illustrating an example computing system that may be used in some embodiments.

In some embodiments, such as in FIG. 9, a data center 900 may be viewed as a collection of shared computing resources and/or shared infrastructure. For example, as shown in FIG. 9, a data center 900 may include virtual machine slots 904, physical hosts 902, power supplies 906, routers 908, isolation zone 910, and geographical location 912. A virtual machine slot 904 may be referred to as a slot or as a resource slot. A physical host 902 may be shared by multiple virtual machine slots 904, each slot 904 being capable of hosting a virtual machine, such as a guest domain. Multiple physical hosts 902 may share a power supply 906, such as a power supply 906 provided on a server rack. A router 908 may service multiple physical hosts 902 across several power supplies 906 to route network traffic. An isolation zone 910 may service many routers 908, the isolation zone 910 being a group of computing resources that may be serviced by redundant resources, such as a backup generator. Isolation zone 910 may reside at a geographical location 912, such as a data center 900. A provisioning server 914 may include a memory and processor configured with instructions to analyze user data and rank available implementation resources using determined roles and shared resources/infrastructure in the calculation. The provisioning server 914 may also manage workflows for provisioning and de-provisioning computing resources as well as detecting health and/or failure of computing resources.

A provisioning server 914 may determine a placement of the resource within the data center. In some embodiments, this placement may be based at least in part on available computing resources and/or relationships between computing resources. In one embodiment, the distance between resources may be measured by the degree of shared resources. This distance may be used in the ranking of resources according to role. For example, a first system on a host 902 that shares a router 908 with a second system may be more proximate to the second system than to a third system only sharing an isolation zone 910. Depending on an application, it may be desirable to keep the distance low to increase throughput or high to increase durability. In another embodiment, the distance may be defined in terms of unshared resources. For example, two slots 904 sharing a router 908 may have a distance of a physical host 902 and a power supply 906. Each difference in resources may be weighted differently in a distance calculation.

A placement calculation may also be used when selecting a prepared resource to transfer to a client account. In one embodiment, a client requests a virtual machine having an operating system. The provisioning server 914 may determine that the request may be satisfied with a staged volume in a slot 904. A placement decision may be made that determines which infrastructure may be desirable to share and which infrastructure is undesirable to share. Using the placement decision, a staged volume that satisfies at least some of the placement decision characteristics may be selected from a pool of available resources. For example, a pool of staged volumes may be used in a cluster computing setup. When a new volume is requested, a provisioning server 914 may determine that a placement near other existing volumes is desirable for latency concerns. Therefore, the decision may find that sharing a router 908 is desirable but sharing a supply 906 and physical host 902 is undesirable. A volume in the pool may then be selected that matches these attributes and placed preferably on a same router 908 as the other volumes but not the same physical host 902 or power supply 906. In other examples of placement decisions, such as those relating to a database shard, sharing of infrastructure may be less desirable and a volume may be selected that has less infrastructure in common with other related volumes.

Figure 10:
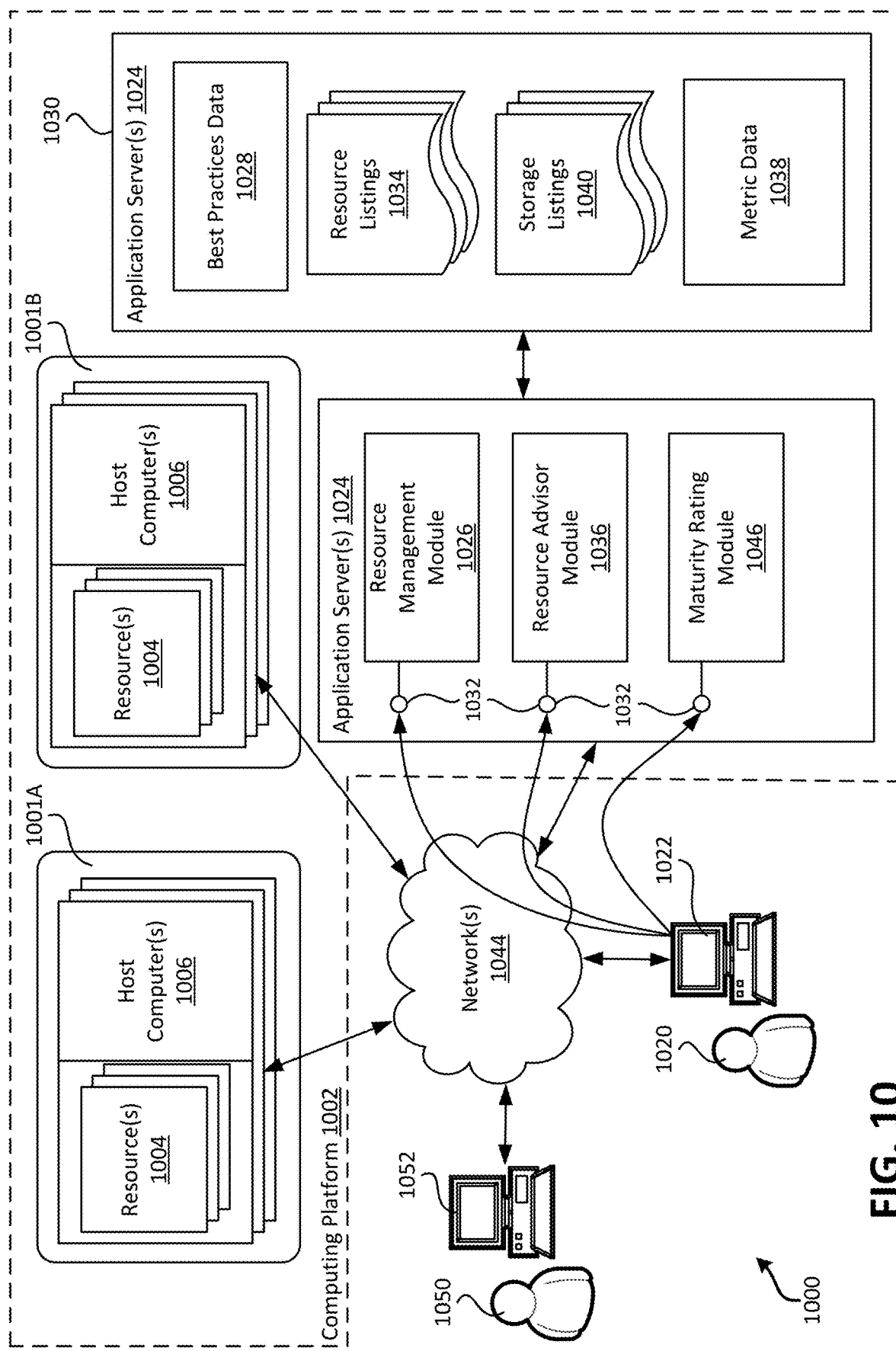
FIG. 10 is a diagram illustrating an example computing system that may be used in some embodiments.

FIG. 10 is a system diagram that shows an illustrative operating environment 1000 including several components for implementing the transfer analysis service 180. The operating environment 1000 may include a computing platform 1002. The computing platform 1002 may be implemented by a computing resource provider to make computing resources available to customers 1020 for the deployment and execution of distributed applications.

The computing resources provided by the computing platform 1002 may include various classes of resources, such as data processing resources, data storage resources, data communication resources, and the like. Each class of computing resource may be general purpose or may be available in a number of specific configurations. For example, data processing resources provided by the computing resource provider may be made available in discrete units or resources 1004. Each resource 1004 may represent the data processing resources of a dedicated host computer 1006, referred to herein as a dedicated tenancy resource, or each resource 1004 may represent a virtual machine resource executing on a host computer 1006, which may also be referred to as a shared tenancy resource.

The host computers 1006 may represent generic multi-processor server devices, special purpose hardware devices, and the like. As discussed above, various types and configurations of resources 1004 may be made available. For example, each available resource 1004 of data processing resources may be of a particular size—such as small, medium, and large—representing different combinations of physical and/or virtual resources comprising or allocated to the resource—such as number and types of processors, amounts of memory, size and speed of local storage, number of networking addresses or communication channels, and/or the like. A resource 1004 may further be configured with a particular platform, such as a specific OS and/or hypervisor installed on the resource. Resources 1004 may also be made available with specific application software components installed, such as web server software, database management software, portal software, a specific runtime environment or platform, and the like.

Resources may further be available in specific availability zones 1001A and 1001B, as described above. As discussed above, an availability zone 1001 may represent a particular physical location, such as a data center or other physical and/or logical grouping of underlying host computers 1006 and computing devices supporting the resources 1004 provided by the computing platform 1002. Providing resources 1004 in different sizes and in different availability zones 1001 may allow a deployed application to be geographically dispersed, improving end-user performance and insulating the overall application from failures in one particular location or zone. For example, a customer 1020 may choose to deploy a number of small resources 1004 across multiple availability zones 1001 for some functions of the application, such as web servers, while deploying a single large resource 1004 for other functions, such as a database server, for example. The customer 1020 may also require that resources 1004 be hosted by host computers 1006 in particular geographical locations for geopolitical reasons as well.

End-users 1050 may utilize end-user computer systems 1052 to access the functionality of the application executing on the allocated resources 1004 through one or more networks 1044. The network(s) 1044 may represent a combination of local-area networks (LANs), wide-area networks (WANs), the Internet, and/or any other networking infrastructure known in the art that connects the host computers 1006 in the computing platform 1002 to the end-user computer systems 1052, to each other and to other computing resources. The end-user computer systems 1052 may represent personal computers (PCs), desktop workstations, laptops, notebooks, personal digital assistants (PDAs), electronic-book readers, game consoles, set-top boxes, consumer electronics devices, server computers, or any other computing device capable of connecting to the network(s) 1044, and communicating with the host computers 1006 in the computing platform 1002.

A customer 1020 wishing to access resources on the computing platform 1002 may similarly utilize a customer computer system 1022 to connect the computing platform over the network(s) 1044, and to configure and manage the computing resources provided by the computing platform. In this regard, the computing platform 1002 may include a number of application servers 1024 that provide various management services to the customer 1020 for purchasing and maintaining resources 1004 of data processing and/or other computing resources, deploying components of the application across the purchased resources 1004, monitoring and administering execution of the application, and the like. As in the case of the end-user computer systems 1052, the customer computer systems 1022 may represent PCs, desktop workstations, laptops, notebooks, PDAs, electronic-book readers, game consoles, set-top boxes, consumer electronics devices, server computers or any other computing device capable of connecting to the network(s) 1044, and communicating with the application servers 1024 in the computing platform 1002.

The application servers 1024 may represent standard server computers, database servers, web servers, network appliances, desktop computers, other computing devices, and any combination thereof. The application servers 1024 may execute a number of modules in order to provide the management services. The modules may execute on a single application server 1024 or in parallel across multiple application servers in the computing platform 1002. In addition, each module may consist of a number of subcomponents executing on different application servers 1024 or other computing devices in the computing platform 1002. The modules may be implemented as software, hardware, or any combination of the two.

The application servers 1024 may execute a resource management module 1026. The resource management module 1026 may allow customers 1020 to purchase and configure resources 1004 of data processing or other computing resources, manage and maintain purchased resources 1004, and the like. Resources 1004 may include resources that may be obtained through various modes, such as reserved resources, time-limited resources, and on-demand resources as described above. Purchased resources 1004 for each customer 1020 and corresponding configuration and status information may be stored in best practices data 1028. The best practices data 1028 may be stored in a database 1030 or other data storage system available to the application server(s) 1024 in the computing platform 1002.

As described above, reserved resources provide the customer with the ability to reserve a number of a specific type and configuration of resources for a term, such as one year or three years. The reserved resources may represent actual resources of data processing resources configured as specified and placed in stand-by for launch and deployment by the customer 1020 at a future time, or the reserved resources 1004 may represent overall capacity reserved by the computing resource provider for quick configuration and launch when required. When deploying an application, a customer 1020 may purchase and launch a number of on-demand resources 1004 of a specific type and configuration (e.g., size, platform, tenancy, availability zone, and the like) to support immediate availability of the application; as well as a number of reserved resources of the same or similar type and configuration for scaling up the application in the future in response to increased demand or capacity requirements of the application, for example.

A customer 1020 may utilize a web browser application executing on the customer computer system 1022 to access a user interface presented by the resource management module 1026 through a web service to perform the configuration and maintenance of the customer's purchased resources 1004. The customer 1020 may also utilize a web browser application executing on the customer computer system 1022 to access a user interface presented by the maturity rating module 1046 or resource advisor module 1036 through a web service to request templates as discussed above. Additionally or alternatively, the resource management module 1026, resource advisor module 1036, and/or maturity rating module 1046 may expose an application programming interface (API) 1032, which may be accessed over the network(s) 1044 by stand-alone application programs executing on the customer computer system 1022. Other mechanisms for accessing the configuration and maintenance services of the resource management module 1026, resource advisor module 1036, or resource status manager module 1046 may also be imagined, including remote procedure calls, SOAP-based web services, remote file access, proprietary client-server architectures, and the like.

In some embodiments, the resource management module 1026 may allow customers 1020 to purchase both on-demand resources and reserved resources. On-demand resources may be purchased and launched immediately, allowing for quick deployment of the components of the application. On-demand resources may further be added or removed as needed, either manually or automatically through auto scaling, as demand for, or capacity requirements of the application changes over time. The customer 1020 may incur ongoing usage costs related to their on-demand resources, based on the number of hours of operation of the resources 1004 and/or the actual resources utilized, for example.

The customer 1020 may submit a request that includes one or more parameters so that resource advisor module 1036 can determine potentially relevant parameters for selected resources and metrics of interest. The resource advisor module 1036 and template manager module 1046 may access the resource listings 1034, storage listings 1040, and metric data 1038 in the database 1030 to access metrics data and process the metrics data to generate recommendations and templates regarding customer 1020's resources.

The application servers 1024 may execute resource advisor module 1036 and template manager module 1046. The customer 1020 may utilize a web browser application executing on the customer computer system 1022 to access a user interfaces (UI) presented by the resource advisor module 1036 and template manager module 1046 through a web service. Additionally or alternatively, the resource advisor module 1036 and resource status manager module 1046 may expose an API 1032, which may be accessed over the network(s) 1044 by stand-alone application programs executing on the customer computer system 1022.

The resource advisor module 1036 and resource status manager module 1046 may further store data records regarding submitted and fulfilled requests in the database 1030 or other data storage system. The metrics data 1038 may also be utilized by customer 1020 or the computing resource provider to record billing data regarding the requested analysis.

The user can also be provided a user interface for viewing recommendations from the resource advisor module 1036 and templates generated by template manager module 1046. For example, the user may be able to access a user interface presented by the resource advisor module 1036 of FIG. 10 to review recommendations. The resource advisor module 1036 or another module in the computing platform 1002 may present a user interface to the customer 1020 in a window of a web browser or other client application executing on the customer computer system 1022.

In some embodiments, an API or a programming interface sub-system may be provided for facilitating the submission of information pertaining to recommendations or templates. The API may be configured to receive electronic messages that encode identifiers indicative of request for fulfillment by the provider network. In response to receiving one of the electronic messages, the API may send second electronic messages indicative of information indicating that the request has been received. An API may also be provided that can facilitate exchange of data with applications that may provide additional information for submitting requests.

In additional embodiments, the resource advisor module 1036 or maturity rating module 1046 or other modules in the computing platform 1002 may provide user interfaces or APIs 1032 to the customer 1020 and/or customer computer system 1022 that allow the customer 1020 to submit or review other information.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems, and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable.

Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computer-implemented method for providing an assessment of reliability of a transfer of a computing resource between networks, the method comprising:
   monitoring success rates of a plurality of transfers of computing resources to a provider network;
   receiving, from a user of computing resources operated by the provider network, a request to transfer one or more virtual machine images from a source computing network to the provider network wherein the source computing network and the provider network are different networks;
   in response to receiving the request, computing a risk rating indicative of a probability of successfully transferring the virtual machine image to the provider network, the risk rating determined based at least in part on analyzing the one or more virtual machine images, success rates of transfers of the plurality of transfers of computing resources that have configurations and utilizations similar to the configuration and utilization associated with the requested transfer, and one or more risk scoring criteria associated with the requested transfer; and
   generating a user interface indicative of the determined risk rating and providing one or more recommendations pertaining to the determined risk score, wherein the determined risk rating is indicative of a predicted likelihood of success of the requested transfer, and wherein the one or more recommendations include time periods for transferring the one or more computing resources wherein the time periods are based on utilization data gathered over a plurality of time periods.

2. The method according to claim 1, wherein the one or more scoring criteria comprises workload utilization of the one or more computing resources.

3. The method according to claim 1, wherein the one or more scoring criteria comprises a success rate of similar transfers at the provider network.

4. The method according to claim 1, wherein the one or more scoring criteria comprises known unsupported configurations and data formats of the one or more computing resources.

5. The method according to claim 1, wherein the one or more scoring criteria comprises a known error or fault at the provider network.

6. The method according to claim 1, further comprising providing one or more recommendations pertaining to improvements to the determined risk rating.

7. A system configured to provide computing resources to customers of a provider network, the system comprising:
   at least one memory having stored therein computer instructions that, upon execution by one or more processors of the system, at least cause the system to:
   in response to receiving a request to transfer one or more computing resources from a source computing network to the provider network, wherein the source computing networks and the provider network are different networks, determine a risk score indicative of a probability of successfully transferring the virtual machine image to the provider network, the risk score based at least in part on a success rate of transfers of computing resources with configurations and utilizations similar to the configuration and utilization associated with the requested transfer, and based at least in part analyzing the one or more computing resources and associated computing environment, the analyzing comprising identifying configuration data associated with the one or more computing resources and mapping the configuration data to one or more scoring criteria to determine the risk score; and
   provide an interface indicative of the determined risk score and one or more recommendations pertaining to the determined risk score, wherein the determined risk score is further indicative of a predicted likelihood of success of the requested transfer, and wherein the one or more recommendations include time periods for transferring the one or more computing resources wherein the time periods are based on utilization data gathered over a plurality of time periods.

8. The system according to claim 7, wherein the interface comprises a programmatic interface configured to receive data indicative of the request and send data indicative of the determined risk score.

9. The system according to claim 7, wherein said provide the interface comprises sending one or more electronic messages indicative of the determined risk score.

10. The system according to claim 7, wherein the one or more computing resources include one or more of a virtual machine image, virtual storage resource, or a virtual network resource.

11. The system according to claim 7, further comprising computer instructions that, upon execution by the one or more processors of the system, at least cause the system to receive feedback pertaining to the requested transfer.

12. The system according to claim 7, wherein the one or more scoring criteria comprises one or more of workload utilization of the one or more computing resources, known unsupported configurations and data formats of the one or more computing resources, or a known error or fault at the provider network.

13. A non-transitory computer-readable storage medium having stored thereon computer-readable instructions, the computer-readable instructions that upon execution on one or more computing devices, at least cause the one or more computing devices to:
   monitor success rates of transfers of computing resources to a provider network;
   determine a risk score indicative of a probability of successfully transferring one or more computing resources associated with a customer between a non-provider network and the provider network, wherein the non-provider network and the provider network are different networks, the risk score based at least in part on analyzing the one or more computing resources, an associated computing environment for the one or more computing resources, and data, obtained by the monitoring, indicative of previously successful or failed transfers of computing resources with similar configurations and utilizations; and
   generate a user interface indicative of the determined risk score and one or more recommended time periods for transferring the one or more computing resources wherein the time periods are based on utilization data gathered over a plurality of time periods, and wherein the determined risk score is indicative of risk associated with the transferring.

14. The non-transitory computer-readable medium of claim 13, wherein the user interface is an API configured to:
receive first electronic messages that encode identifiers indicative of a request for the risk score; and
in response to receiving one of the first electronic messages, send second electronic messages indicative of information pertaining to the risk score.

15. The non-transitory computer-readable medium of claim 13, wherein the determined risk score comprises a percentage probability over a period of time.

16. The non-transitory computer-readable medium of claim 13, wherein the risk score is further based on a comparison of a user's on-premises computing environment for the one or more computing resources and a target computing environment at the provider network.

17. The non-transitory computer-readable medium of claim 13, wherein the risk score is associated with one or more levels of service for providing the transferring.

18. The non-transitory computer-readable medium of claim 17, further comprising computer-readable instructions that upon execution on the one or more computing devices, at least cause the one or more computing devices to update the one or more levels of service based on data associated with the transferring.

* * * * *